United States Patent [19]

Yotsutsuji et al.

[11] 4,285,661
[45] Aug. 25, 1981

[54] VALVE NOZZLE OF INJECTION MOLDING MACHINE

[75] Inventors: Akira Yotsutsuji; Seiichi Ueda, both of Nara; Kiyoshi Uemura, Sakai, all of Japan

[73] Assignee: Osaka City, Osaka, Japan

[21] Appl. No.: 98,742

[22] Filed: Nov. 30, 1979

[30] Foreign Application Priority Data

Dec. 5, 1978 [JP] Japan .................. 53-149701
Oct. 22, 1979 [JP] Japan .................. 54-135276

[51] Int. Cl.³ .............................. B29F 1/03
[52] U.S. Cl. ............................ 425/563; 425/566
[58] Field of Search ...... 425/563, 564, 566, DIG. 229

[56] References Cited

U.S. PATENT DOCUMENTS

| 3,010,156 | 11/1961 | Smith ......................... 425/564 X |
| 3,344,477 | 10/1967 | Stokis ........................ 425/564 X |
| 3,590,439 | 7/1971 | Swanson ..................... 425/564 X |
| 4,171,941 | 10/1979 | Yotsutsuji .................. 425/566 X |

FOREIGN PATENT DOCUMENTS 2208014  8/1973  Fed. Rep. of Germany ........... 425/563

*Primary Examiner*—Thomas P. Pavelko
*Attorney, Agent, or Firm*—Oblon, Fisher, Spivak, McClelland & Maier

[57] ABSTRACT

A valve nozzle is used at an end of a hot runner or an injection molding machine for an injection molding. The valve nozzle comprises a cylinder as a body of the nozzle, and a piston. The cylinder has a gate and has a larger inner diameter at the rear end and a smaller inner diameter at the front end. The piston has a passage in the piston and has a large outer diameter at the rear end and a smaller outer diameter at the front end.

4 Claims, 12 Drawing Figures

VALVE NOZZLE OF INJECTION MOLDING MACHINE

BACKGROUND OF THE INVENTION

1. Field of the Invention

The present invention relates to a valve nozzle of an injection molding machine for injection-molding a molding compound into a mold. More particularly, it relates to a valve nozzle of an injection molding machine in a hot runner system.

2. Description of the Prior Arts

An injection molding machine for injection-molding a molding compound made of a synthetic resin such as a thermoplastic resin or a thermosettable resin, has a nozzle at the end. A hot runner system has been known as a method of injection-molding without using a sprue or a runner of a mold. A valve nozzle has been known as a nozzle equipped at the end of the hot runner system. The valve nozzle has been used for preventing a leakage of an injection molding compound from a gate during the time of non-injection of the molding compound and for preventing a reverse flow of an injection molding compound from a cavity when the pressure for the injection molding is reduced.

The typical valve nozzle is a valve nozzle equipped with a needle valve. The systems for actuating the needle valve of the valve nozzle include a system for actuating it by an external power mechanism and a system for actuating it by the pressure for the injection molding.

The former system has disadvantages of a complicated mechanism causing many faults. Thus, the latter system is considered to be superior to the former system.

The latter system has been proposed in Japanese Unexamined Patent Publication 158654/1975 wherein a needle valve is opened and closed by a piston sliding in a cylinder as a nozzle body.

FIG. 1 is a schematic sectional view of the nozzle having the needle valve.

The nozzle comprises a cylinder (1) as a nozzle body; a piston (2) for sliding in the cylinder (1) and a needle valve (3) connecting to the piston (2). In the piston (2), the sectional area at the rear end (4) of the piston in the down-flow of the injection molding compound is smaller than a sectional area of the front end (5). Thus, in the inner diameter of the cylinder (2), the inner diameter at the rear end (6) is smaller than the inner diameter at the front end (7). The piston (2) has a passage (8) for flowing the injection molding compound in the piston and is pushed to the flow direction of the injection molding compound by a spring (9). The gate (10) of the needle valve (10) at the end of the nozzle is opened and closed by shifting the piston (2).

In the valve nozzle having the above-described structure, the injection molding compound is fed from the right side into the passage in the piston to fill it in the nozzle and to cause a pressure difference to the piston by the difference of the sectional area at the rear end from that of the front end of the piston and the piston is shifted to the right side when the inner pressure difference is increased over the pushing force to the piston whereby the gate of the needle valve is opened to actuate the valve nozzle. On the contrary, when the pressure for the injection molding is reduced under the condition of the opening of the gate, the inner pressure difference to the piston is decreased less than the pushing force of the spring, and accordingly, the piston is shifted to the left direction to close the gate of the needle valve.

The valve nozzle is advantageous in view of the automatic opening and closing depending upon the change of the pressure for the injection molding. However, it is not satisfactory. As one problem, the shift of the piston is not so fast as expected. When the injection molding compound has low melt viscosity such as a melted polystyrene, the operation is substantially satisfactory. However, when it has high melt viscosity such as polycarbonates and fiber reinforced resins reinforced with a filler or a glass fiber, the operation is not satisfactorily fast, because the pressure loss in the passage in the piston or on the inner wall of the cylinder is too high and the pressure at the front end of the piston is too low. The satisfactory pressure difference over the pushing force of the spring is not resulted and the piston is not shifted unless the difference of the sectional areas of the piston is effectively utilized to proportion the pressure at the front end of the piston to the pressure at the rear end of the piston. Even though the piston is shifted to open the gate and the injection molding compound is flowed, it is difficult to maintain the pressure difference for preventing the shifting of the piston against the flow of the molding compound.

As the second problem, when the reverse flow pressure of the injection molding compound injected into the cavity is increased, there is high possibility to cause the reverse flow of the injection molding compound into the nozzle by opening the gate.

In the injection compressing molding for a compress-molding of the molding compound injected into the cavity, the reverse flow pressure is remarkably high and the needle valve is pushed by the molding compound to open the gate whereby the reverse flow is easily caused. When the pushing force of the spring is increased to prevent the reverse flow, the difficulty of the operation of the valve is caused because of the former problem. When the sectional area of the gate is decreased to prevent the reverse flow, the following third problem may be caused. Thus, the problem is not dissolved by it.

As the third problem, the sectional area of the gate at the end of the nozzle can not be increased. In order to complete the injection for a short time, it is necessary to inject a large amount of the injection molding compound for a short time.

In the valve nozzle having the needle valve, the sectional area of the gate can not be increased. Even though the sectional area of the gate can be increased by certain manner, a gate mar remained on the product or a diameter of the spool are large and accordingly the cutting or the grinding these parts are not easy.

SUMMARY OF THE INVENTION

It is an object of the present invention to provide a novel valve nozzle used in an injection molding machine especially a novel valve nozzle used for a hot runner type injection molding machine.

The other object of the present invention is to provide a valve nozzle for opening and closing in high response regardless of a kind of the injection molding compound.

The other object of the present invention is to provide a valve nozzle which is durable to the reverse flow pressure of the injection molding compound. The other object of the present invention is to provide a valve nozzle which can inject a high rate of the injection molding compound for a specific time.

The foregoing and other objects of the present invention have been attained by providing a valve nozzle for an injection molding machine which comprises a cylinder as a body of the nozzle which has an inlet for an injection molding compound at the rear end in the down stream direction of the molding compound and a gate for injecting molding compound at the front end and has a larger inner diameter at the rear end and a smaller inner diameter at the front end; a piston which slides along the inner wall of the cylinder and has a larger outer diameter at the rear end and a smaller outer diameter at the front end and has a passage for passing the molding compound from the rear end of the cylinder to the front end; and a valve for opening and closing the gate connected through the valve stem to the piston.

DETAILED DESCRIPTION OF THE PREFERRED EMBODIMENTS

Figure 1:
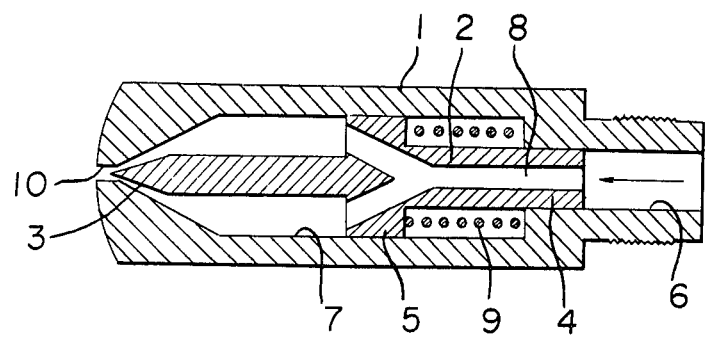
FIG. 1 is a sectional view of a conventional valve nozzle equipped with a needle valve.
Figure 2:
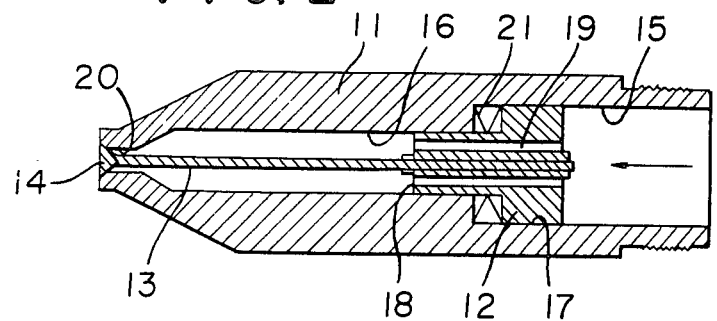
FIG. 2 is a sectional view showing the fundamental structure of the valve nozzle of the present invention.

FIG. 2 is a sectional view of the fundamental structure of the valve nozzle of the present invention. The valve nozzle comprises a cylinder as a nozzle body; a piston which internally contacts with the cylinder (11); and a valve (14) which is connected through a valve stem (13) to the piston (12). The inner diameter of the cylinder (11) at the rear end (15) is larger than that of the front end (16). The outer diameter of the piston (12) at the rear end (17) is larger than that of the front end (18). The smaller diameter part (18) of the piston at the end slides without disconnecting from the smaller diameter part (16) of the cylinder (12). The piston (12) internally has one or more passage (19) which extends through the piston and feeds the injection molding compound from the rear end to the front end. The valve (14) is conical and opens or closes a gate (20). A spring (21) is preferably fitted between the piston (12) and the small diameter part (16) of the cylinder. In the state closing the gate (20) by the valve (14), it is unnecessary to push the piston by the spring (21) whereas in the state opening the gate (20) by the valve (14), the spring (21) pushes the piston. When the gate (20) is closed, the force is utilized. That is, the spring (21) pushes the piston (12) to the rear end direction. In the state closing the gate (20) by the valve (14), the piston (12) is not pushed or only slightly pushed whereas in the state opening the gate (20) by the valve (14), the spring (21) forcibly pushes the piston (12) to the rear end direction.

The injection molding compound is fed from the rear end of the valve nozzle to the front end as shown by the arrow line. When the injection molding compound is filled in the cylinder (11) and the gate (20) is closed by the valve as shown in FIG. 2 and the pressure for the injection is increased, if the inner pressure in the larger diameter part (15) of the cylinder is equal to the inner pressure in the smaller diameter part (16), the pushing pressure of the piston (12) at the larger diameter part (17) is larger than that of the smaller diameter part (18) because of the difference of areas. Thus, the pushing force is applied at the front end of the piston (12). In practice, the inner pressure of the cylinder at the smaller diameter part is smaller than that of the larger diameter part because of the flow resistance in the passage (19). Thus, the pushing pressure applied at the front end of the piston (12) is yet higher. The pushing pressure is high when the injection molding compound having high fluidity is used. Moreover, the pressure of the valve (14) is further applied. The piston (12) is shifted to the front end direction against the force of the spring (21) whereby the gate (20) is opened by the valve (14). In the state opening the gate (20) to inject the injection molding compound, the pushing pressure difference and the inner pressure difference applied to the piston (12) are maintained. The flow resistivity of the injection molding compound passing through the passage (19) is also applied. Therefore, there is substantially not a trouble of the shifting of the piston (12) to the rear end direction in such time.

When the injection molding compound is filled in the cavity to decrease the injection pressure, the piston (12) is shifted to the rear end direction to close the gate (20) by the valve (14) without failure. When the pressure for the injection is decreased, the inner pressure of the cylinder (11) at the larger diameter part is suddenly decreased to be remarkably smaller than the inner pressure at the smaller diameter part. Therefore, the pushing pressure of the piston at the smaller diameter part is larger than that of the larger diameter part regardless of the difference of the diameter of the piston (12). Moreover, the rear-flow pressure is applied to the front end of the valve (14) and the piston (12) is shifted by the pushing force of the spring (21) to the rear end direction whereby the gate (20) is closed by the valve (14).

As described, the operation of the valve nozzle of the present invention is reliable and stable, because the shifting direction of the piston during the opening the gate by the valve, coincides to the flow direction of the injection molding compound.

The pressure applied to the surface of the piston to which the injection molding compound is injected easily increases over the pressure applied to the rear surface and accordingly, enough force for shifting the piston is easily applied even though the difference of areas is not so much. Moreover, the resistivity against the flow of the injection molding compound in the passage results the force for opening the gate by the valve and the force for closing the valve is not caused during the flowing the injection molding compound. This phenomenon is opposite to that of the conventional one.

When the flow of the molding compound is stopped, the resistivity is lost whereby the valve is easily closed. The resistivity is higher when the molding compound having lower fluidity is used. Therefore, even though the molding compound having lower fluidity is used, the stable operation is performed.

Further, in accordance with the valve nozzle of the present invention, the gate is not opened even though the reverse flow pressure is increased, since the increase of the reverse flow pressure causes to close firmly the gate. Moreover, the sectional area of the gate can be large in the valve nozzle of the present invention. The gate of the valve nozzle of the present invention is annular and accordingly, the sectional area of the gate can be increased by increasing the annular diameter. The width of the annular gate can be short. Thus, the gate mar or sprue is cylindrical but the thickness can be thin and accordingly, the cutting or the grinding for removing the mar or sprue is not difficult. Further more, there is not a trouble of the rear flow of the injection molding compound, even though the sectional area of the gate is large.

Figure 3:
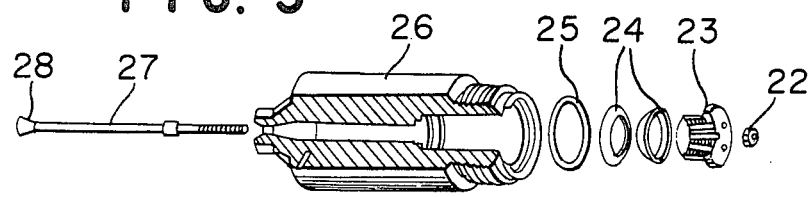
FIG. 3 is a disassembled view of one embodiment of the valve nozzle of the present invention wherein the cylinder and the piston are partially shown.

FIG. 3 is a disassembled partially sectional view of one embodiment of the valve nozzle the present invention used as the nozzle chip for a hot runner system.

In FIG. 3, an adjusting nut (22); a cylinder (23); two washer springs (24); a ring for sealing; a cylinder (26) as a nozzle body; and a valve stem (27) having a valve (28) at the front end are arranged.

Figure 4:
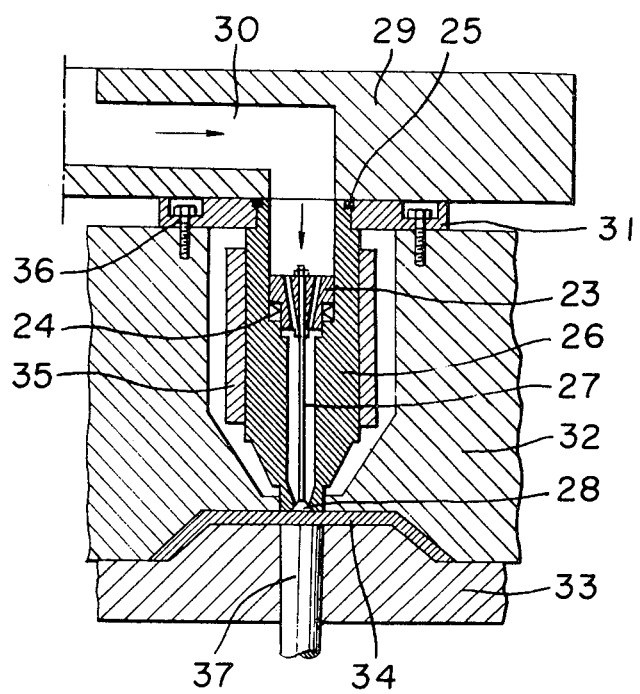
FIG. 4 is a sectional view of a nozzle chip part of a hot runner type injection molding machine equipped with the valve nozzle shown in FIG. 3.

FIG. 4 is a sectional view of the nozzle chip at the end of the hot runner system in the injection molding machine equipped with the valve nozzle shown in FIG. 3. The parts of the valve stem having the valve and the ejector pin, etc. are not shown as sectional views. The injection molding compound which is fed from the injector through the hot runner (30) in the manifold block (29), further is passed through the cylinder (26) fixed by the ring (31) and is injected into a cavity (34) between a stationary mold (32) and a movable mold (33).

The cylinder (26) is covered by a heater (35) and is fixed by the ring (31) which is screwed by bolts (36) to the stationary mold (32). The molded product in the cavity (34) is taken out by an ejector pin (37) when the mold is opened.

In FIGS. 3 and 4, a stopper is formed to control the distance for shifting the piston (23) to the front end direction. The diameter of the cylinder (26) at the front end direction is further smaller so as to prevent the further movement of the piston (23) to the front end direction by holding the end of the piston (23) at the stepped position.

The stopper can be formed at the larger diameter part of the cylinder (26), for example, at the part of the spring (24) in the drawing. The stopper is to prevent over-run of the valve (28) into the cavity (34) so as to prevent the remaining of the valve mar on the surface of the molded product. At the reverse direction, the piston is stopped by the conical valve to the gate.

The valve nozzle of the present invention can be modified in various features.

Figure 5:
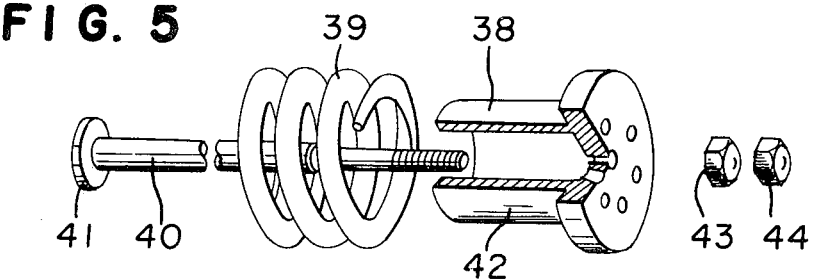
FIG. 5 is a disassembled view of the other embodiment of the valve nozzle of the present invention wherein a cylinder is not shown.

FIG. 5 shows one modification wherein only the piston (38), the spring (39), the valve stem (40) and the valve (41) are shown.

In the piston (38), the passages are short so as to easily flow the injection molding compound by decreasing flow resistivity in the passages (42). A spiral spring (39) is used instead of the washer spring. The valve stem (40) is fixed to the piston (38) by the adjusting screws (43), (44). The valve (41) is a disc valve.

Figure 6:
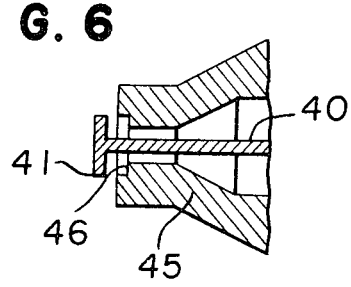
FIG. 6 is a sectional view of the front end of the valve nozzle shown in FIG. 5.
Figure 7:
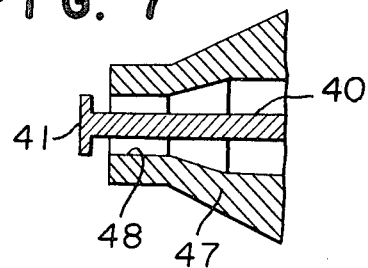
FIG. 7 is a sectional view of the other embodiment of the present invention.

The advantage of the disc valve is that the diameter of the gate can be large. When the injection molding compound having high viscosity is injected through the conical valve, heat is easily generated at the gate whereas such trouble is not caused when the disc valve is used. The position of the rear shifting of the valve is controlled by the stopper at the gate hole when the disc valve is used. For example, as shown in FIG. 6, the position of the rear shifting of the valve is controlled by contacting the disc valve (41) with the stepped part (46) at the gate hole of the cylinder (45). Thus, when the stopper is formed at the gate hole, the diameter of the gate hole is smaller. Thus, it is preferable to use a straight hole as the gate hole (48) at the end of the cylinder (47) as shown in FIG. 7. In this feature, the stopper for controlling the position of the rear shifting of the valve can be a stopper for controlling the rear shifting of the piston or the below-mentioned sliding holder.

There is possibility that the disc valve is not precisely fit into the gate hole when the gate is closed after the injection. In order to make easy the insertion of the disc valve into the gate hole as the conical valve, it is preferable to provide a guide for the insertion at the side of the stem of the disc valve.

FIG. 8(A) shows a disc valve (51) having an insertion guide (50) at the end of the stem (49). In order to overcome this problem, it is optimum to form a sliding holder for preventing bending of the valve stem. The sliding holder can be formed on the stem near the valve and is a slidable device for preventing a fluctuation of the stem by inwardly contacting with the inner wall of the gate hole.

FIG. 8(B) shows one example of the sliding holder (52) which inwardly contacts with the gate hole even though the gate is opened whereby the deviation of the center of the stem (53) and the disc valve (54) from the center of the gate hole. Sometimes, the sliding holder is preferably departed from the valve, because the injection molding compound may not be uniformly injected from all of the peripheral parts of the gate hole when the valve shown in FIG. 8(B) is used. In the structure of FIG. 8(B), the injection molding compound is not easily injected from the positions in the gate hole corresponding to the convex parts of the sliding holder (52) contacting with the gate hole. Thus, it is preferable to depart the sliding holder (55) or (56) from the valve (57) or (58) as shown in FIGS. 8(C), (D). The sliding holder (55) shown in FIG. 8(C) contacts with the gate hole. The sliding holder (56) shown in FIG. 8(D) contacts with the inner wall of the cylinder which has larger diameter than that of the gate hole.

Figure 8:
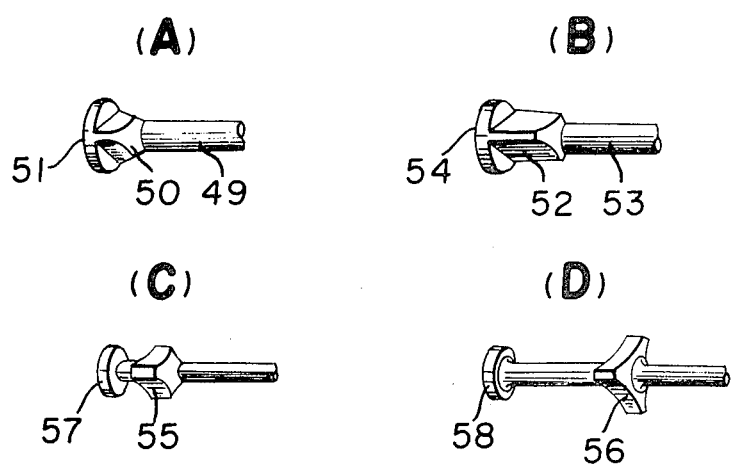
FIG. 8 shows four configurations of the valves used in the valve nozzle of the present invention.

The configuration of the sliding holder is not critical and is to prevent the deviation of the center of the stem by sliding on the inner wall of the cylinder or the gate hole. Thus, the disc or the cylinder having grooves for passing the injection molding compound as shown in FIG. 8 is preferably used.

Figure 9:
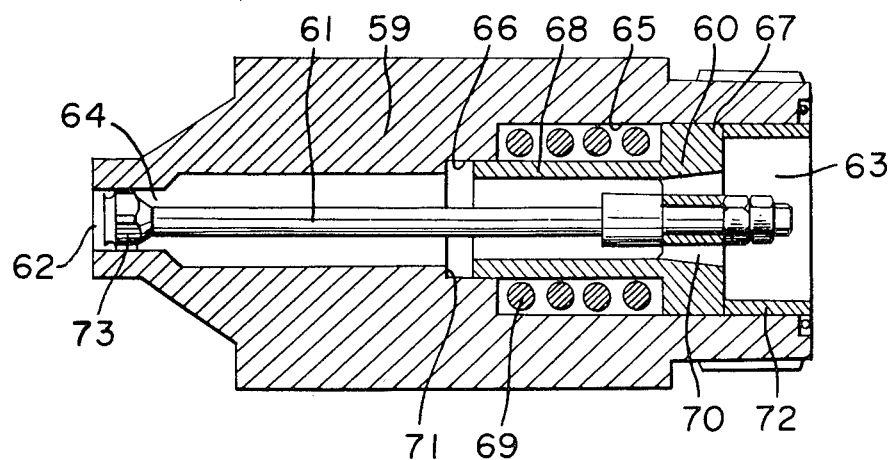
FIG. 9 is a sectional view of the other embodiment of the valve nozzle of the present invention.

FIG. 9 shows an embodiment of the valve nozzle having the improved parts. The valve nozzle comprises a cylinder as a nozzle body; a piston (60) sliding on the inner wall of the cylinder (59); and a valve (62) which is connected through the valve stem (61) to the piston (60). (The valve and the valve stem are not shown by their sectional views). The inlet (63) for the injection molding compound is formed at right side of the cylinder (59) and the injection gate (64) is formed at left side of the cylinder (59). The injection molding compound is flowed from the right rear end to the left front end in the drawing. The inner diameter of the cylinder (59) at the rear end (65) is larger than that of the front end (66) in at least the sliding range of the piston (60). The outer diameter of the piston (60) at the rear end (67) is larger than that of the front end (68).

The spiral coil spring (69) is provided at the inner stepped part of the cylinder and the outer stepped part of the piston, so as to push the piston (60) to the rear end direction. The passage (70) for passing the injection molding compound from the rear end of the cylinder to the front end, is formed in the piston (60). The forward position of the piston (60) is controlled by the step (71) at the smaller diameter end of the piston whereas the backward position of the piston (60) is controlled by the stopper (72) at the larger diameter end of the piston. The sliding holder (73) mounted on the stem (61) at the position departing from the valve (62) is held in the gate hole.

The valve nozzle of the present invention can be used as the nozzle chip used at the front end of the hot runner system as well as the valve nozzle at the front end of the injection molding machine. The injection molding machine having the valve nozzle of the present invention can be used for a molding of a thermoplastic resin as well as a thermosettable resin. The valve nozzle of the present invention is especially advantageously used for the injection molding of a thermoplastic resin containing a reinforcing fiber such as a glass fiber; a thermoplastic resin containing a relatively large amount of a filler; or a thermoplastic resin having high melt viscosity such as polycarbonate which are relatively difficult to use in the injection molding through the conventional valve nozzle. The valve nozzle of the present invention can be also used for the injection molding of synthetic resin compounds beside the thermoplastic resins, such as a thermosettable resin containing a filler or a reinforcing fiber.

The valve nozzle of the present invention can be used in an injection compressing molding without a trouble of a rear flow of the molding compound.

In the injection compressing molding method, the mold is slightly opened in the injection of the molding compound and the mold is closed under high pressure after the injection whereby the molded product having high quality as those of the compressing molded product can be obtained. In the molding of a thermosettable resin containing relatively large amount of a reinforcing fiber or a filler, no orientation of the fiber is caused to obtain an excellent molded product.

When the conventional valve nozzle is used, there is high possibility to cause the rear flow and accordingly, the injection compressing molding can not be carried out. On the contrary, the valve nozzle of the present invention can be used for such injection compressing molding because of no trouble of the rear flow of the molding compound.

We claim:

1. A valve nozzle for an injection molding machine cooperable with a mold cavity, comprising:
   a cylinder;
   a longitudinal bore in said cylinder, said bore having a first portion of a first predetermined diameter at a first end of said cylinder and a second portion of second predetermined diameter at a second end of said cylinder, said second diameter being smaller than said first diameter;
   an injection molding compound inlet to said bore at said first end;
   an injection molding compound outlet from said bore at said second end, said outlet extending perpendicular to said bore;
   a piston slidable in said bore, said piston having a first portion of said first predetermined diameter at said first end and a second portion of said second predetermined diameter at said second end, said piston including at least one passage extending through said first and second portions;
   a valve stem extending from said piston toward said outlet and extendable into said mold cavity; and
   a valve fixed to said stem adjacent said outlet, said valve forming a disk coaxial with said bore and seating upon said perpendicular outlet.

2. A valve nozzle according to claim 1 which further comprises a spring pushing the piston towards said first end.

3. A valve nozzle according to claim 1 which further comprises a stopper for controlling a position of the shifting of the piston, at the first portion of the piston.

4. A valve nozzle according to claim 1 which further comprises a sliding holder on said stem near said valve.

* * * * *